US011129370B1

(12) United States Patent
Shaw et al.

(10) Patent No.: US 11,129,370 B1
(45) Date of Patent: Sep. 28, 2021

(54) THERMODYNAMIC TERMINATOR AND METHOD OF ELIMINATING MITES AND PARASITES WITHIN A BEE BOX

(71) Applicants: Darrell Shaw, Thornton, WA (US); John Shaw, Vancouver, WA (US)

(72) Inventors: Darrell Shaw, Thornton, WA (US); John Shaw, Vancouver, WA (US)

(*) Notice: Subject to any disclaimer, the term of this patent is extended or adjusted under 35 U.S.C. 154(b) by 0 days.

(21) Appl. No.: 17/212,304

(22) Filed: Mar. 25, 2021

Related U.S. Application Data

(60) Provisional application No. 63/019,944, filed on May 4, 2020.

(51) Int. Cl.
*A01K 51/00* (2006.01)
*A01M 1/20* (2006.01)

(52) U.S. Cl.
CPC ........... *A01K 51/00* (2013.01); *A01M 1/2094* (2013.01)

(58) Field of Classification Search
CPC ........ A01K 47/00; A01K 47/06; A01K 51/00; A01M 1/2094; A01M 2200/01; A01M 2200/011
USPC ....................................... 449/1–3, 12–15, 32
See application file for complete search history.

(56) References Cited

U.S. PATENT DOCUMENTS

| 2,506,118 A * | 5/1950 | Taylor ................... A01K 47/06 449/12 |
| 3,927,431 A * | 12/1975 | Wallace ................. A01K 47/06 449/14 |
| 3,994,034 A * | 11/1976 | Van Damme .......... A01K 47/06 449/12 |
| 4,483,031 A * | 11/1984 | Shaparew .............. A01K 47/06 449/14 |
| 4,494,528 A * | 1/1985 | Horton ................... A01K 47/06 126/627 |

(Continued)

FOREIGN PATENT DOCUMENTS

| DE | 3308017 C1 * | 3/1984 | ............. A01K 51/00 |
| DE | 3643872 A1 * | 6/1988 | ............. A01K 51/00 |

(Continued)

OTHER PUBLICATIONS

English-language translation of KR 10-2020-0021190 (Year: 2020).*

(Continued)

*Primary Examiner* — Lisa L Tsang
(74) *Attorney, Agent, or Firm* — Argus Intellectual Enterprise; Jordan Sworen; Daniel Enea

(57) ABSTRACT

A thermodynamic terminator and a method of eliminating mites and parasites within a bee box. The thermodynamic terminator includes a housing having a lower panel with a fan aperture, an air intake, and an interior wall for supporting a divider panel. The divider panel extends from a sidewall of the housing to form a first compartment and a second compartment. A heating element is positioned within the first compartment and can regulate heat within the first compartment and the bee box. When the thermodynamic terminator is mounted to the bee box and activated, air is heated by the heating element and forced into the bee box by a system fan. The heated air is circulated within the bee box and forced to return to the first compartment via the air intake. A controller regulates the heating temperature and period of activation.

13 Claims, 5 Drawing Sheets

(56) References Cited

U.S. PATENT DOCUMENTS

| | | | |
|---|---|---|---|
| 4,497,079 A * | 2/1985 | Kettl | A01K 47/06 449/14 |
| 5,069,651 A | 12/1991 | Arndt | |
| 5,575,703 A * | 11/1996 | Stearns | A01K 47/06 449/13 |
| 5,895,310 A * | 4/1999 | Otomo | A01K 47/06 449/1 |
| 8,602,837 B1 * | 12/2013 | Allan | A01K 67/033 449/1 |
| 9,332,739 B2 * | 5/2016 | Al Khazim Al Ghamdi | A01K 47/06 |
| 9,363,984 B2 | 6/2016 | Linhart | |
| 2002/0151249 A1 * | 10/2002 | Scheuneman | A01K 51/00 449/2 |
| 2008/0064298 A1 | 3/2008 | Souza et al. | |
| 2012/0202403 A1 | 8/2012 | Sinanis et al. | |
| 2013/0273808 A1 * | 10/2013 | Al Khazim Al Ghamdi | A01K 47/06 449/13 |
| 2015/0296751 A1 | 10/2015 | Arndt | |
| 2016/0212976 A1 * | 7/2016 | Bulanyy | A01K 47/06 |
| 2017/0064931 A1 | 3/2017 | Tagliaferri | |
| 2017/0354127 A1 * | 12/2017 | Woods | A01K 47/06 |
| 2017/0360010 A1 * | 12/2017 | Wilson-Rich | A01K 47/06 |

FOREIGN PATENT DOCUMENTS

| | | | | |
|---|---|---|---|---|
| DE | 10340308 A1 * | 3/2005 | | A01K 51/00 |
| ES | 2328021 T3 * | 11/2009 | | A01K 51/00 |
| KR | 20180052213 A * | 5/2018 | | |
| KR | 20200021190 A * | 2/2020 | | |
| RU | 2702678 C1 * | 10/2019 | | |
| WO | 2004098276 A2 | 11/2004 | | |

OTHER PUBLICATIONS

English-language translation of DE 3308017 (Year: 1984).*

English-language translation of DE 3643872 (Year: 1988).*

English-language translation of DE 10340308 (Year: 2005).*

* cited by examiner

THERMODYNAMIC TERMINATOR AND METHOD OF ELIMINATING MITES AND PARASITES WITHIN A BEE BOX

CROSS REFERENCE TO RELATED APPLICATION

This application claims the benefit of U.S. Provisional Application No. 63/019,944 filed on May 4, 2020. The above identified patent application is herein incorporated by reference in their entirety.

BACKGROUND OF THE INVENTION

The present invention relates to a device and method of killing mites and parasites in beehives. The present invention further provides a thermodynamic terminator having a housing that forms a closed system that circulates warm air within a bee box.

Beekeepers are faced with the challenge of combatting mite and parasite infestations in beehives. The *Varroa* mite (*Varroa jacobsoni*), a common parasite known to infest beehives, poses a large threat to the bee population. This parasite infests the hive's brood by laying its own eggs on the larva while simultaneously infecting the bee with life threatening viruses. As the larva mature, so do the numerous mite youth, resulting in a continuous cycle of infestation. The presence of these mites in a beehive results in the death of the honeybee colony, causing significant deficits in the beekeeping economy.

There exist various physical, mechanical, and chemical methods for eradicating *Varroa* mite infestations, but perhaps the safest and most effective method involves heat. Prolonged exposure to temperatures of at least 104 degrees Fahrenheit results in the mites falling off the bees and dying. Moreover, it is equally important that the honeybees not be harmed by any treatments. As such, honeybees can tolerate such elevated temperatures.

Some specialized systems for killing mites and parasites in beehives through heating exist. Such devices serve as attachments to beehives that circulate heated air throughout the hive via passageways and utilize temperature sensors to regulate the temperature of the air. Such devices are effective in moderate mite removal, but the open nature of these devices threatens the livelihood of the bees. The components of these devices may cause harm to the bees if contact is made. Thus, the accessibility of these devices to the bees may result in their premature death. There remains a need for an efficient, easy to use, closed system to ensure the treatment and safety of the entirety of the colony.

The present device is to be attached to the bee box. The air inside the device is simultaneously warmed with a heating element and circulated throughout the bee box via system fans. The temperature of the air within the housing is automatically regulated via a thermostat. For example, the heating element is heated until the air in the housing reaches 110 degrees Fahrenheit. Air intakes are positioned at the bottom of the housing for air circulation while a screen prevents the bees from accessing the housing. The closed nature of the device continually circulates the heated air throughout the bee box for a period of time, such as three hours, while preventing the bees from accessing the housing. This system ensures safe, effective treatment of the beehive.

In light of the devices disclosed in the known art, it is submitted that the present invention substantially diverges in design elements and methods from the known art and consequently it is clear that there is a need in the art for an improvement for device and method of killing mites and parasites in beehives. In this regard the instant invention substantially fulfills these needs.

SUMMARY OF THE INVENTION

In view of the foregoing disadvantages inherent in the known types of thermodynamic terminators now present in the known art, the present invention provides a new thermodynamic terminator wherein the same can be utilized for eliminating mites and parasites in beehives without the use of chemicals and excessive temperatures that cause injury to the bees.

It is an objective of the present invention to provide a thermodynamic terminator comprising a housing having a lower panel with a fan aperture, an air intake, and an interior wall for supporting a divider panel. The divider panel extends from a sidewall of the housing to form a first compartment and a second compartment. A heating element is positioned within the first compartment and is adapted to regulate heat within the first compartment and the bee box. When the thermodynamic terminator is mounted to the bee box and activated, air is heated by the heating element and forced into the bee box by a system fan. The heated air is circulated within the bee box and forced to return to the first compartment via the air intake.

It is another objective of the present invention to provide a thermodynamic terminator comprising a controller operably connected to a power source, the heating element, and the fan, such that the controller controls an internal temperature of the closed system via the heating element and the fan.

It is another objective of the present invention to provide a thermodynamic terminator comprising a timer adapted to select a period of time of activation of the thermodynamic terminator.

It is yet another objective of the present invention to provide a thermodynamic terminator wherein the system is enclosed when secured to the bee box and the fan and heating element operate simultaneously to maintain a predetermined temperature within the housing for a predetermined period of time.

It is yet another objective of the present invention to provide a thermodynamic terminator comprising a switch accessible from an exterior of the housing and configured to control temperature of the heating element and time setting of the timer.

It is also another objective of the present invention to provide a method of eliminating mites and parasites within a bee box. The method comprises providing a thermodynamic terminator, the thermodynamic terminator comprising a housing having a lower panel and a sidewall forming an interior volume; the lower panel having a fan aperture and an air intake; a heating element disposed within the interior volume, the heating element adapted to regulate heat within the housing and the bee box; a system fan mounted on the lower panel disposed between the fan aperture and the heating element. The method further comprises mounting the thermodynamic terminator to the bee box forming a closed system such that air is recirculated between the housing and the bee box and heating air within the housing via the heating element, such that air heated by the heating element is forced into the bee box by the system fan, circulated within the bee box, and forced to return to the interior volume via the air intake.

It is therefore an object of the present invention to provide a new and improved thermodynamic terminator that has all of the advantages of the known art and none of the disadvantages.

Other objects, features, and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings.

DETAILED DESCRIPTION OF THE INVENTION

Reference is made herein to the attached drawings. For the purposes of presenting a brief and clear description of the present invention, the preferred embodiment will be discussed as used for eliminating mites and parasites in beehives by temperature controlling an interior of a bee box. The figures are intended for representative purposes only and should not be considered to be limiting in any respect.

Reference will now be made in detail to the exemplary embodiment (s) of the invention. References to "one embodiment," "at least one embodiment," "an embodiment," "one example," "an example," "for example," and so on indicate that the embodiment(s) or example(s) may include a feature, structure, characteristic, property, element, or limitation but that not every embodiment or example necessarily includes that feature, structure, characteristic, property, element, or limitation. Further, repeated use of the phrase "in an embodiment" does not necessarily refer to the same embodiment. As used herein, "bee box" is defined as "a structure in which bees are kept" and may be used interchangeably with "beehive".

Figure 1A:
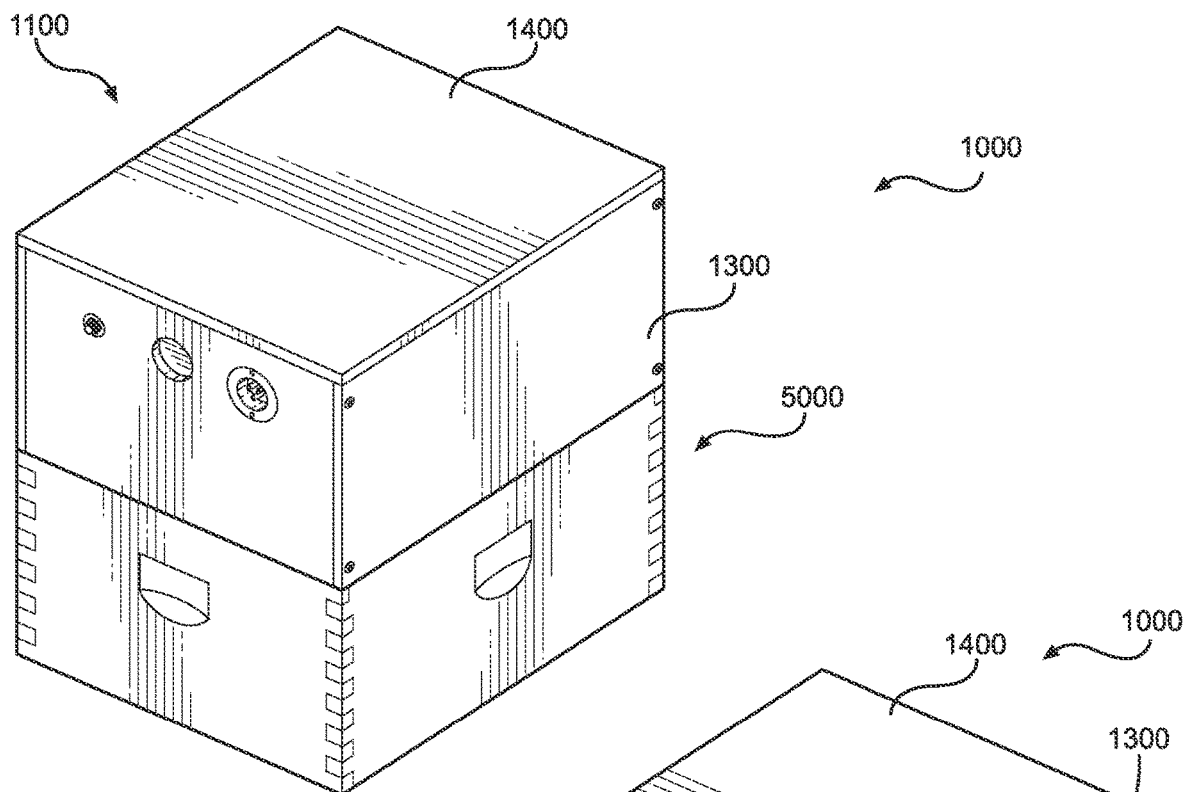
FIG. 1A shows a perspective view of one embodiment of the thermodynamic terminator mounted to an upper end of a bee box.
Figure 1B:
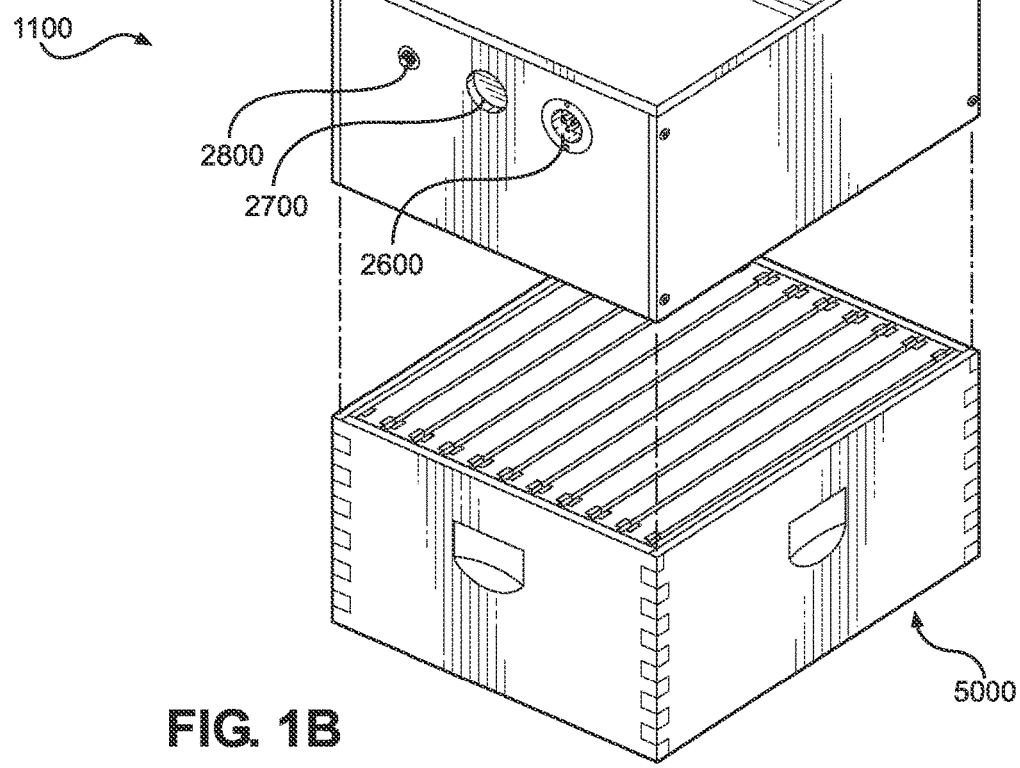
FIG. 1B shows a perspective view of one embodiment of the thermodynamic terminator separated from an upper end of a bee box.

Referring now to FIGS. 1A and 1B, there are shown perspective views of one embodiment of the thermodynamic terminator mounted to and separated from, respectively, an upper end of a bee box. The thermodynamic terminator 1000 provides a system that selectively mounts to a bee box 5000 to eliminate mites and parasites within the bee box 5000. The thermodynamic terminator 1000 delivers heated air to the bee box 5000 in a regulated manner, without harming honeybees, or other species of bees, housed within the bee box 5000.

In one embodiment, the thermodynamic terminator 1000 comprises a housing 1100 having a lower panel (shown in FIG. 4), a top panel 1400, and a sidewall 1300 forming an interior volume 1120. The housing 1100 is shaped to mount to an open upper end of the bee box 5000 cooperatively forming a closed interior volume. When secured to the upper end of the bee box 5000, air is heated within the housing 1100 and circulated between the housing 1100 and the bee box 5000 in order to continuously recirculate the heated air through the bee box 5000 until all the mites and parasites are terminated. In some embodiment, the housing 1100 is constructed from wood or other suitable material, such as a plastic, metal, and the like.

In the shown embodiment, the housing 1100 comprises a cubic shape that has generally the same geometry (the same height, length, and width dimensions) of the existing bee box 5000. In this way, the housing 1100 can be easily transported and positioned above the bee box 5000 for a predetermined period of time. This is also useful since the sidewall 1300 is aligned with the sidewall of the bee box 5000 to prevent outside air from passing between the thermodynamic terminator 1000 and the bee box 5000.

In one embodiment, the housing and bee box form coplanar sidewalls when the housing is seated upon the bee box. In alternative embodiments, the housing 1100 may have any shape, such as a cylindrical, pyramidal, and the like. In this way, the general shape of the thermodynamic terminator 1000 matches the bee box 5000.

Figure 2:
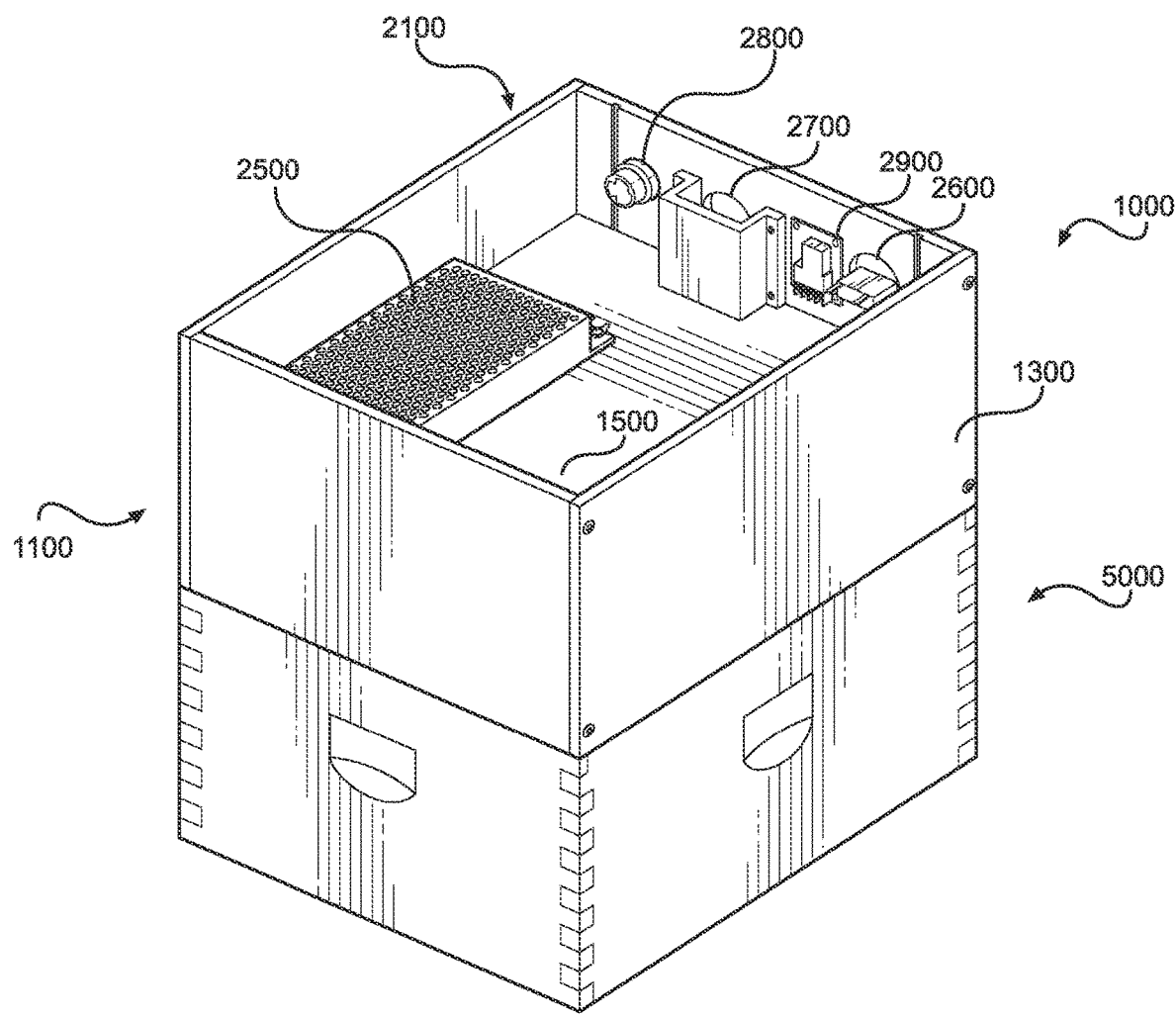
FIG. 2 shows an overhead perspective view of one embodiment of the thermodynamic terminator with a top panel removed to show the first compartment.
Figure 3:
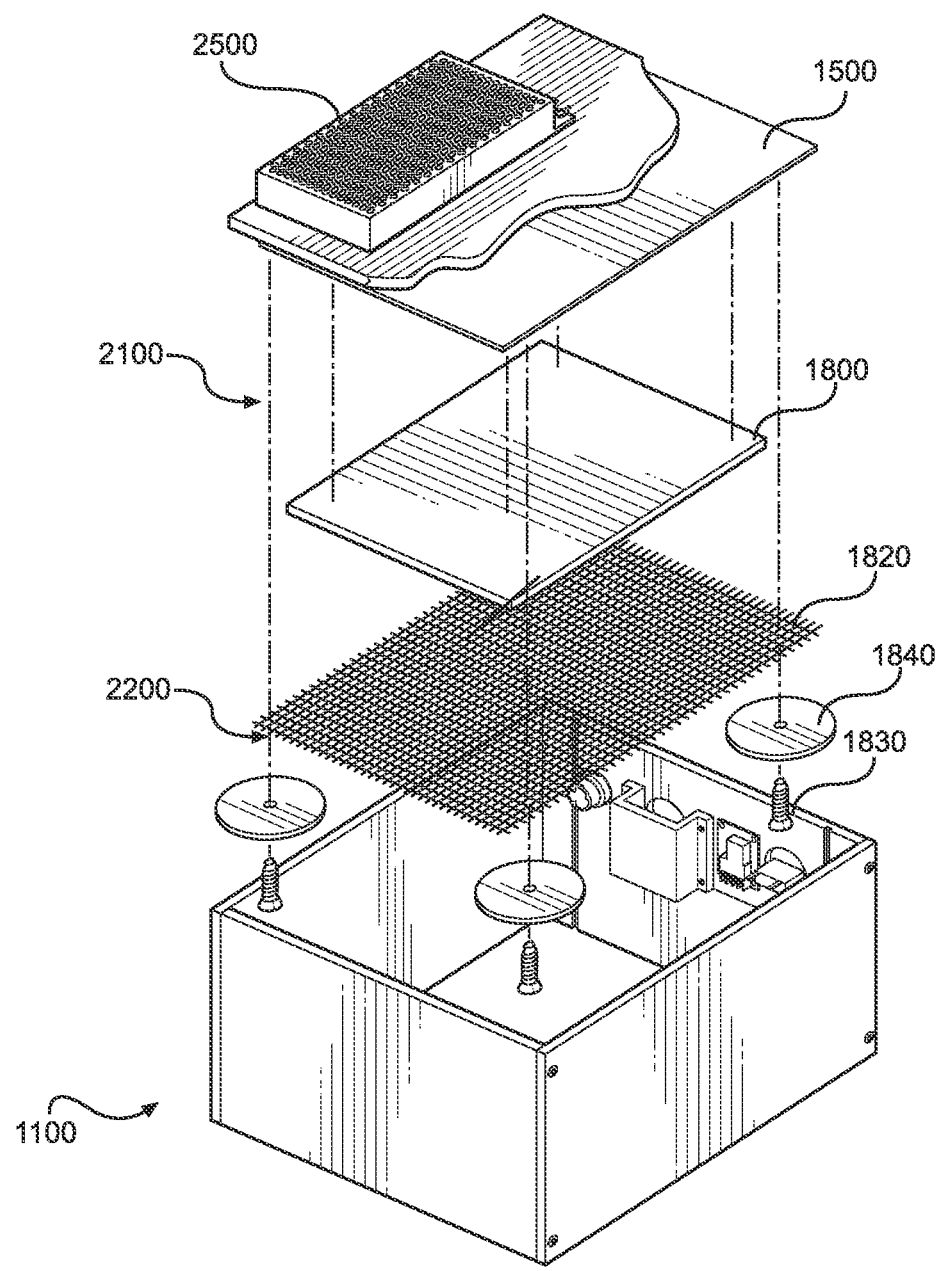
FIG. 3 shows an exploded view of the heating element and divider panel of the thermodynamic terminator.

Referring now to FIGS. 2 and 3, there is shown an overhead perspective view of one embodiment of the thermodynamic terminator with a top panel removed to show the first compartment and an exploded view of one embodiment of the thermodynamic terminator without the lower panel and system fan, respectively.

In the shown embodiment, the second compartment 2100 of the housing 1100 is exposed since the top panel is removed from the housing 1100. A divider panel 1500 extends from the sidewall 1300 to form the first compartment 2200 and a second compartment 2100. In the shown embodiment, the first and second compartments 2100, 2200 are in a stacked configuration, wherein the first compartment 2200 is positioned beneath the second compartment 2100. The second compartment 2100 houses the controls of the thermodynamic terminator, wherein the first compartment 2200 generates and expels the heated air into the bee box.

A controller 2500 is disposed within the second compartment 2100 and is adapted to control a heating element 1800 disposed within the first compartment 2100. In one embodiment, the controller 2500 includes a switch 2800 that is accessible from an exterior of the housing 1100, wherein the switch 2800 is configured to control temperature of the heating element 1800. The controller 2500 also includes a timer adapted to select a period of time of activation of the thermodynamic terminator 1000. In the illustrated embodiment, the timer is automatically activated upon activation of the switch 2800. In other embodiments, the timer is set independently of the activation of the switch.

In the shown embodiment, the housing 1100 further comprises a circuit breaker 2900 and corresponding circuit breaker switch that is disposed on the exterior of the housing 1100. In some embodiments, the switch 2800 controls the circuit breaker, timer, and the thermostat of the controller 2500. The circuit breaker 2900 is adapted to automatically shut off electrical supply from a power source via a power source outlet 2600 to protect the thermodynamic terminator 1000 from damage caused by excess current from an overload or short circuit. The power source outlet 2600 of the thermodynamic terminator 1000 connects to an external power source, such as electrical power provided from wall outlets. In alternative embodiments, the power source may include a battery or other portable device.

Specifically referring to FIG. 3, the heating element 1800 is mounted to a lower side of the divider panel 1500. In the shown embodiment, the heating element 1800 is suspended from the divider panel 1500 via a grid panel 1820 having a plurality of fasteners 1830 and washers 1840. In the illustrated embodiment, the heating element 1800 is in a shape of a flat rectangular pad designed to fit within the perimeter of the divider panel 1500. In alternate embodiments, the heating element comprises any suitable shape adapted to supply a desired amount of heat. The grid panel 1820 comprises a plurality of openings allowing the heat to freely pass therethrough. In the illustrated embodiment, the divider panel 1500 is adapted to isolate the first compartment from the second compartment, as well as support the controller 2500 of the second compartment and the heating element of the first compartment.

Figure 4:
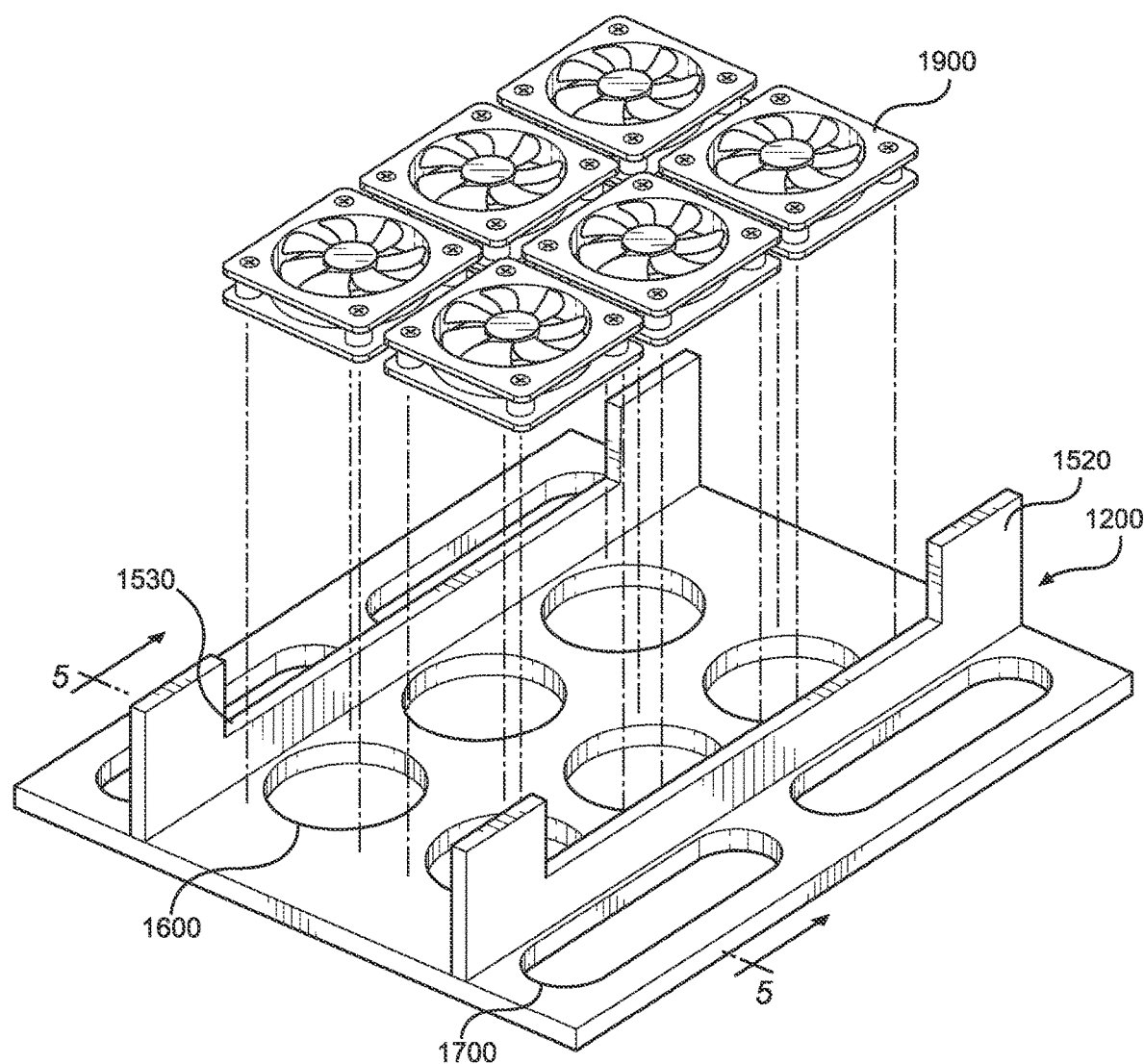
FIG. 4 shows an exploded view of a bottom panel and system fan of the housing of an embodiment of the thermodynamic terminator.
Figure 5:
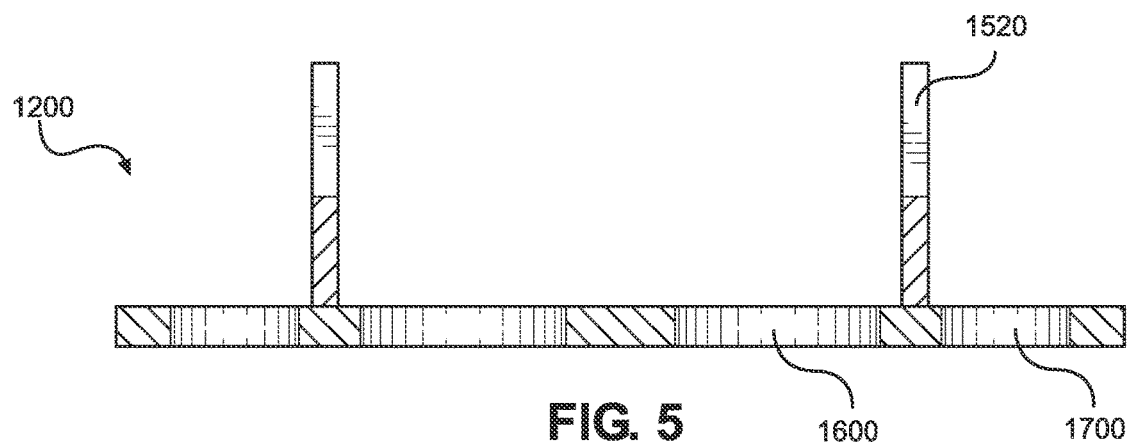
FIG. 5 shows cross sectional view of the second compartment of one embodiment of the thermodynamic terminator taken along line 5-5 of FIG. 4.

Referring now to FIGS. 4 and 5, there is shown an exploded view of one embodiment of the bottom panel and system fan of the housing of the thermodynamic terminator and a cross sectional view of the second compartment taken along line 5-5 of FIG. 4, respectively. In the shown embodiment, the lower panel 1200 includes a fan aperture 1600, an air intake 1700, and an interior wall 1520 for supporting the divider panel (shown in FIG. 3) thereon. The fan apertures 1600 are positioned beneath the heating element 1800 in the first compartment and correspond to the system fan 1900. In one embodiment, the system fan 1900 is mounted to the lower panel 1200 within the first compartment and disposed between the fan aperture 1600 and the heating element 1800. As shown, the number of system fans 1900 corresponds to the number of fan apertures 1600. However, in alternative embodiments, one or more system fans 1900 may be used with one or more fan apertures 1600.

In the shown embodiment, the interior wall 1520 are shown to separate the fan apertures 1600 from the air intakes 1700. In the illustrated embodiment, the air intakes 1700 are elongated apertures extending only along opposing lateral sides of the lower panel. The interior wall 1520 include a pair of walls that are parallel to each other, and extend between opposing sides of the housing 1100, front to back for example. The interior wall 1520 is positioned on lateral sides of the fan aperture 1600 and is positioned proximal to the air intakes 1700, wherein the interior wall 1520 includes a recess 1530 to allow the air to pass between the air intake 1700 and the fan aperture 1600. In this way, as air is drawn from the bee box into the first compartment through the air intakes 1700, the air is forced to pass through the recess 1530 and be heated or reheated via the heating element. In the illustrated embodiment, the uppermost end of the pair of walls of the interior wall 1520 abuts the underside of the divider panel 1500, wherein the grid panel 1820 and heating element 1800 are contained between the boundaries of the interior walls 1520.

The system fans 1900 draw the heated air from the first compartment and push the heated air through the fan apertures 1600 of the lower panel 1200. In this way, the closed system is formed, and heat is transferred from the thermodynamic terminator 1000 to the bee box. The controller 2500 (shown in FIG. 3) and other electronic components are housed in the second compartment to thermally isolate them from the first compartment, and to prevent overheating thereof. In one embodiment, the first and second compartments are fluidly isolated from each via the divider panel 1500, wherein the divider panel forms a seal within the housing.

Figure 6:
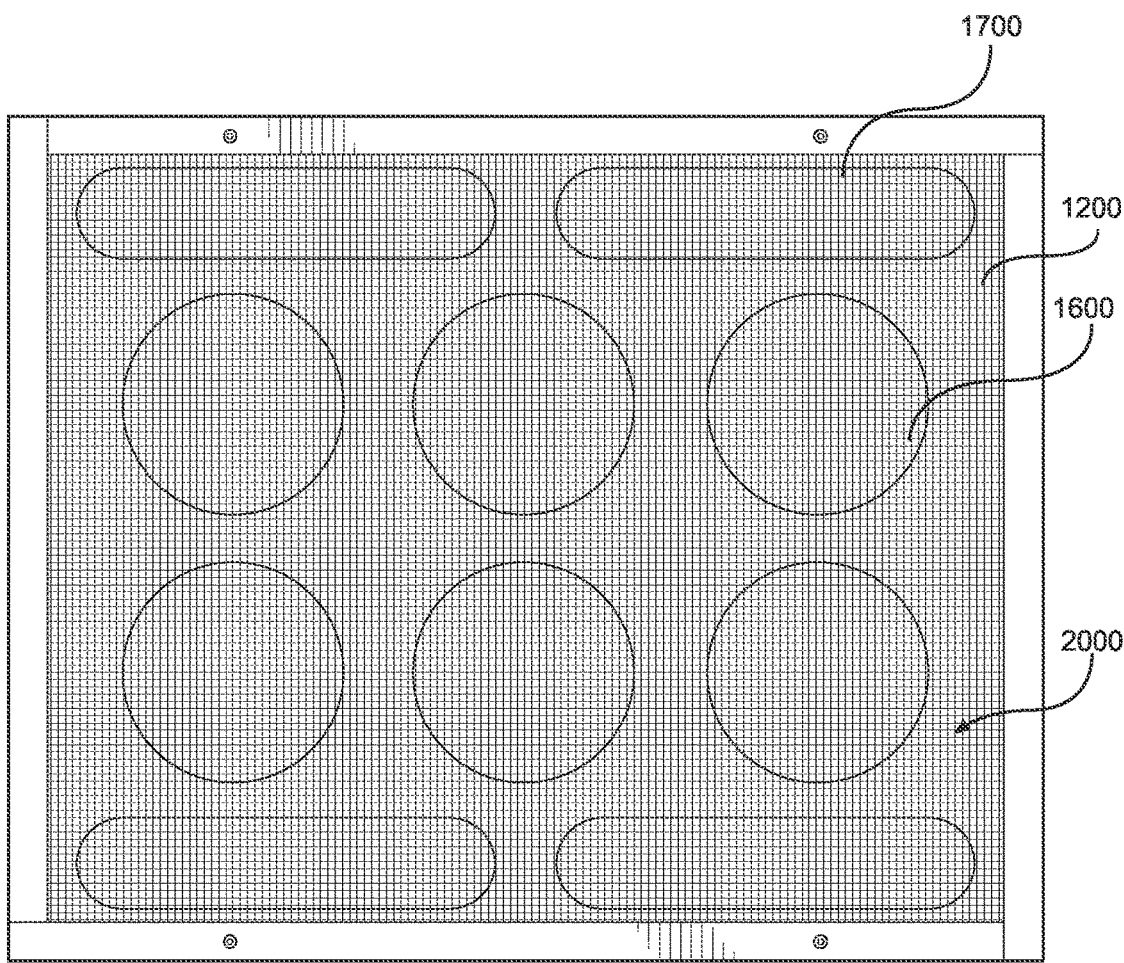
FIG. 6 shows an underside view of one embodiment of the bottom panel of the housing of the thermodynamic terminator with screen affixed.

Referring now to FIG. 6, there is shown an underside view of one embodiment of the bottom panel of the housing of the thermodynamic terminator with screen affixed. In the illustrated embodiment, a screen 2000 is positioned over an exterior side of the lower panel 1200 to prevent access to the first compartment by bees housed within the bee box. In one embodiment, the screen 2000 is selectively removable from the lower panel 1200 via fasteners. Additionally, the perimeter of the screen 2000 is sized to match the perimeters of the housing and the bee box, such that the housing and bee box form coplanar sidewalls when the housing is seated upon the bee box. The apertures formed by the screen 2000 to prevent bees from passing therethrough may be interchanged with second screens 2000 of various sizes. In the illustrated embodiment, the lower panel 1200 is secured directly to the lower end of the sidewall of the housing.

In operation, the housing is positioned atop the bee box such that the perimeter of the lower side of the housing is aligned above a perimeter of the bee box. In this way, a seal is formed and no or limited external air flow is provided within the housing. Once the power source is connected to the power source outlet, such as a male receptacle, the timer is activated, and the heating element and fans are turned on. The heating element continuously activates and deactivates to maintain a predetermined temperature measured via a thermostat disposed within the housing. In one illustrated method, the heating element maintains a temperature of 110 degrees F. for 3 hours. Once air is heated by the heating element, the air is pushed into a central area of the bee box by the fan, wherein the air then circulates to opposing sides of the bee box. The air flow moves upwards from the opposing sides of the bee box to the two pairs of opposing slots disposed within the panel, wherein the heated air is recirculated through the heating element and fans. This is performed continuously until the predetermined time has elapsed and the timer is deactivated, thereby deactivating the fan and the heating element.

Another method of eliminating mites and parasites within a bee box comprises providing a thermodynamic terminator, the thermodynamic terminator comprising the housing having a lower panel and a sidewall forming an interior volume; the lower panel having a fan aperture and an air intake; a heating element disposed within the interior volume, the heating element adapted to regulate heat within the housing and the bee box; a system fan mounted on the lower panel disposed between the fan aperture and the heating element. The method further comprises mounting the thermodynamic terminator to the bee box forming a closed system such that air is recirculated between the housing and the bee box and heating air within the housing via the heating element, such that air heated by the heating element is forced into the bee box by the system fan, circulated within the bee box, and forced to return to the interior volume via the air intake.

In one embodiment, the method also includes providing the thermodynamic terminator further comprising a divider panel extends from the sidewall to form a first compartment and a second compartment.

In one embodiment, the lower panel of the thermodynamic terminator comprises an interior wall for supporting the divider panel thereon and the heating element is disposed within the first compartment and the system fan is mounted on the lower panel within the first compartment.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly, and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A thermodynamic terminator for selectively mounting to a bee box to eliminate mites and parasites within the bee box, comprising:
   a housing having a lower panel and a sidewall forming an interior volume;
   wherein a divider panel extends from the sidewall to form a first compartment and a second compartment;
   the lower panel having a fan aperture, an air intake, and an interior wall for supporting the divider panel thereon;
   a heating element disposed within the first compartment, the heating element adapted to regulate heat within the first compartment and the bee box;
   a system fan mounted on the lower panel within the first compartment and disposed between the fan aperture and the heating element;
   wherein the housing is mounted to the bee box, such that air heated by the heating element is forced into the bee box by the fan, circulated within the bee box, and forced to return to the first compartment via the air intake;
   wherein the housing and bee box form a closed system such that air is recirculated between the first compartment and the bee box.

2. The thermodynamic terminator of claim 1, wherein the housing further comprises a controller operably connected to a power source, the heating element, and the fan, such that the controller controls an internal temperature of the closed system via the heating element and the fan.

3. The thermodynamic terminator of claim 2, wherein the controller includes a timer adapted to select a period of time of activation of the thermodynamic terminator.

4. The thermodynamic terminator of claim 3, wherein the controller includes a switch that is accessible from an exterior of the housing and configured to control temperature of the heating element and time setting of the timer.

5. The thermodynamic terminator of claim 2, wherein the housing further comprises a circuit breaker switch disposed on the housing, the circuit breaker adapted to automatically shut off electrical supply from the power source to protect the thermodynamic terminator from damage caused by excess current from an overload or short circuit.

6. The thermodynamic terminator of claim 2, wherein the housing includes a top panel that encloses the second compartment, wherein the second compartment houses the controller.

7. The thermodynamic terminator of claim 1, wherein the first and second compartments are in a stacked configuration.

8. The thermodynamic terminator of claim 1, wherein the heating element is mounted to a lower side of the divider panel.

9. The thermodynamic terminator of claim 8, wherein the heating element is suspended from the divider panel.

10. The thermodynamic terminator of claim 1, wherein a screen is positioned over an exterior side of the lower panel to prevent access to the first compartment by bees housed within the bee box.

11. The thermodynamic terminator of claim 1, wherein the fan and the heating element operate simultaneously to maintain a predetermined temperature within the closed system for a predetermined period of time.

12. The thermodynamic terminator of claim 1, wherein the interior wall is positioned on lateral sides of the fan aperture and is positioned proximal to the air intake, wherein the interior wall includes a recess to allow the air to pass between the air intake and the fan aperture.

13. A method of eliminating mites and parasites within a bee box, the method comprising:
   providing a thermodynamic terminator, the thermodynamic terminator comprising:
      a housing having a lower panel and a sidewall forming an interior volume;
      the lower panel having a fan aperture and an air intake;
      a heating element disposed within the interior volume, the heating element adapted to regulate heat within the housing and the bee box;
      a system fan mounted on the lower panel, the system fan disposed between the fan aperture and the heating element;
   mounting the thermodynamic terminator to the bee box forming a closed system such that air is recirculated between the housing and the bee box;
   heating air within the housing via the heating element, such that air heated by the heating element is forced into the bee box by the system fan, circulated within the bee box, and forced to return to the interior volume via the air intake;
   wherein the thermodynamic terminator further comprises a divider panel that extends from the sidewall to form a first compartment and a second compartment;
   wherein the lower panel comprises an interior wall for supporting the divider panel thereon; and
   wherein the heating element is disposed within the first compartment, and the system fan is mounted on the lower panel within the first compartment.

* * * * *